United States Patent [19]

Hendricks

[11] Patent Number: 4,601,371
[45] Date of Patent: Jul. 22, 1986

[54] ALTERNATING CURRENT CLUTCH

[75] Inventor: Wayne D. Hendricks, Mukwonago, Wis.

[73] Assignee: Wehr Corporation, Milwaukee, Wis.

[21] Appl. No.: 500,375

[22] Filed: Jun. 2, 1983

[51] Int. Cl.⁴ .............................................. F16D 11/00
[52] U.S. Cl. .................................. 192/52; 192/84 R; 192/70.28
[58] Field of Search .............. 192/84 A, 84 R, 110 R, 192/70.28, 84 C, 52

[56] References Cited

U.S. PATENT DOCUMENTS

| | | | |
|---|---|---|---|
| 2,430,174 | 11/1947 | Hoover | 192/84 C X |
| 2,618,368 | 11/1952 | Hoover | 192/84 R |
| 2,687,789 | 8/1954 | Nardone | 192/84 A X |
| 2,700,439 | 1/1955 | Hodgson | 192/84 R X |
| 2,908,369 | 10/1959 | Frey et al. | 192/84 A X |

FOREIGN PATENT DOCUMENTS 616978  3/1961  Canada ............................. 192/84 C Primary Examiner—Samuel Scott
Assistant Examiner—Carl D. Price

[57] ABSTRACT

A non-rotatable, axially movable control ring is connected to the ring on the clutch input through a thrust bearing to control engagement and disengagement of the clutch input with the output. The control ring is biased to the clutch disengaged position by springs which are weaker than those biasing a loading plate to a stop cancelling out of the loading spring force. Energization of the magnet coil fixed on the control initially causes movement of the coil towards the armature fixed on the loading plate. That causes the clutch to engage before the magnet air gap is closed. Therefore, the armature moves to the coil and this lifts the loading plate off its stop against the loading spring. When the armature engages the coil, the loading spring acting on the plate acts through the magnet to the control plate to load the clutch and determine torque capacity which is adjusted by adjusting the load on the torque spring.

27 Claims, 4 Drawing Figures

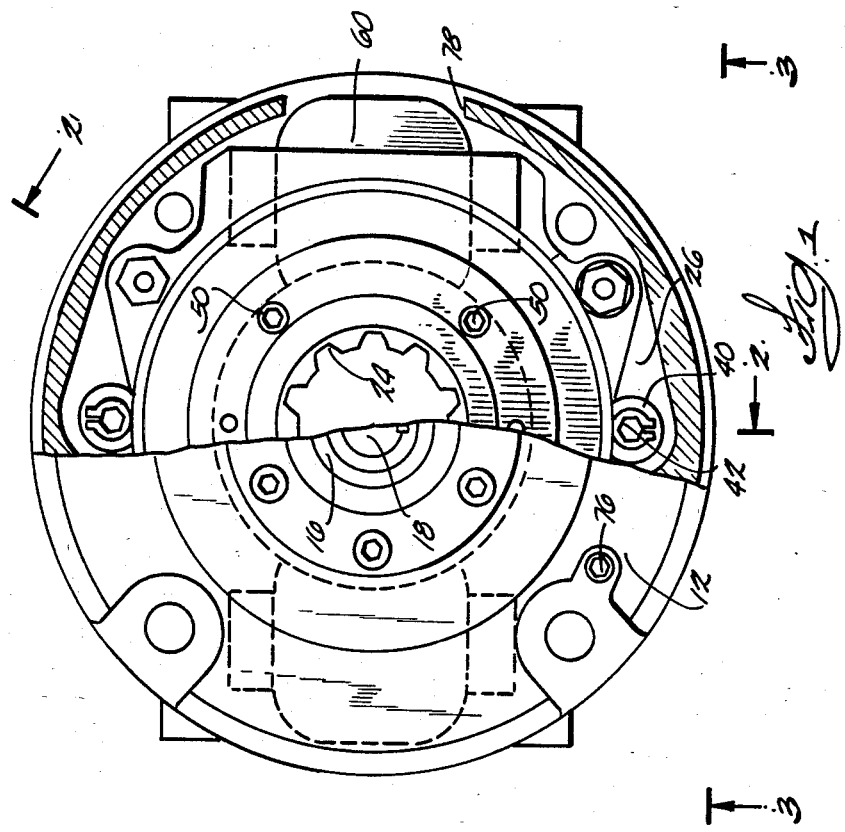
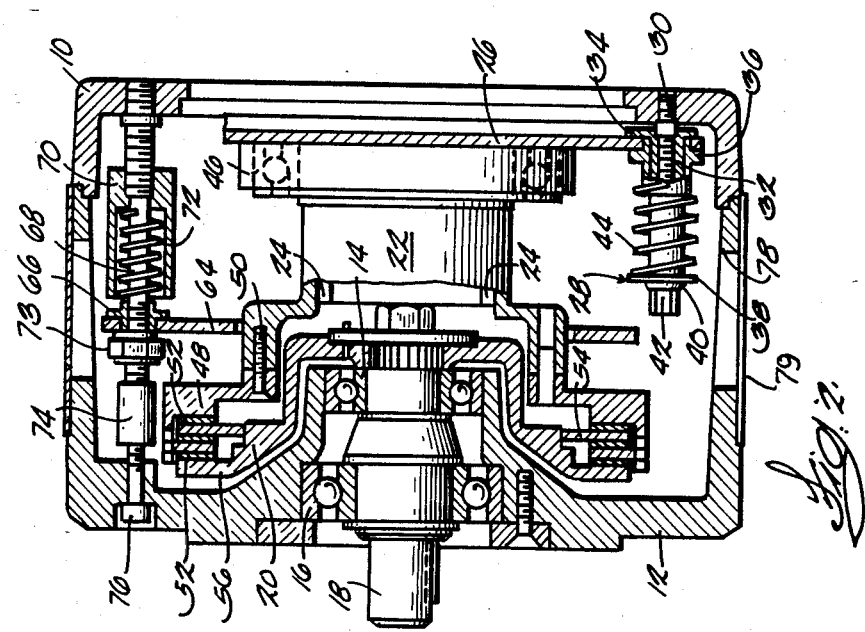

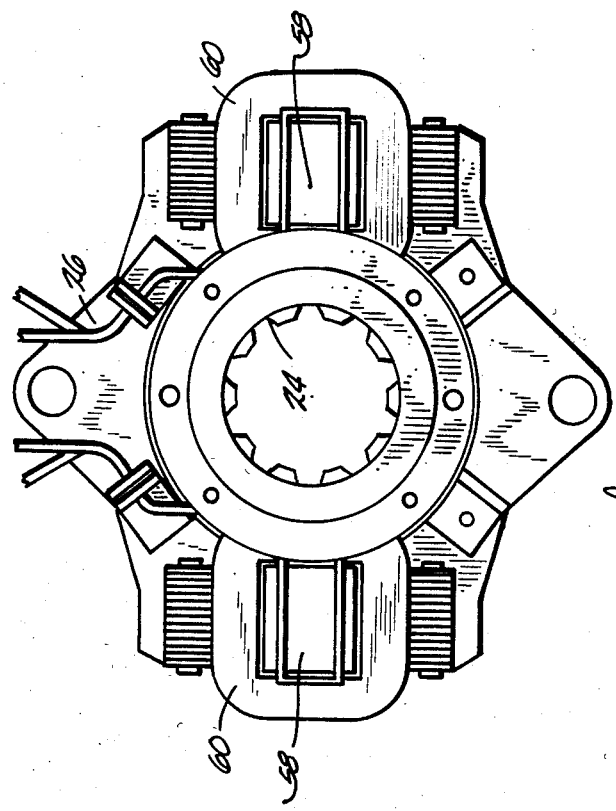
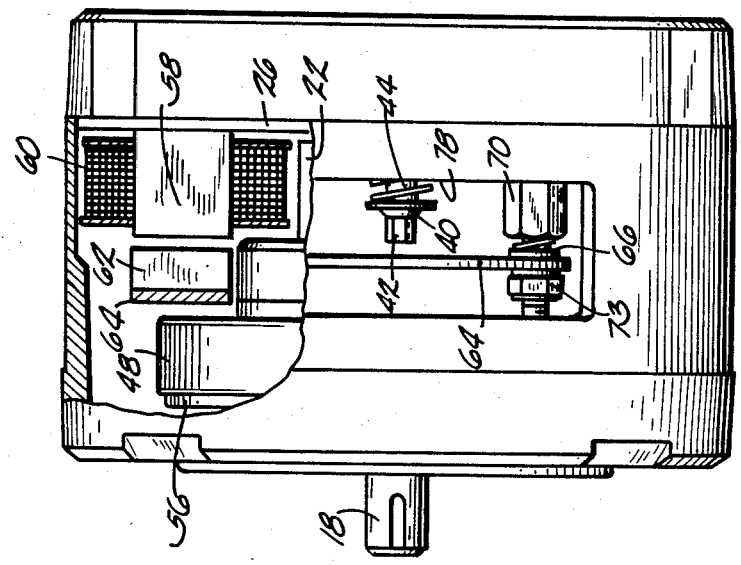

ALTERNATING CURRENT CLUTCH

BACKGROUND OF THE INVENTION

The provision of a clutch for an A.C. motor is somewhat of a "Catch 22" in that provision of an A.C. clutch requires collector rings to supply the current to the clutch parts. That is expensive and requires maintenance. The alternative is to use a D.C. clutch which requires a rectified voltage supply which entails an expense. This approach does, however, afford adjustment of the clutch torque or power transmission by changing the applied voltage. To adjust an A.C. clutch has required disassembly of the clutch to adjust the spring force or to change the springs. Both approaches represent compromises and costly compromises at that.

SUMMARY OF THE INVENTION

This invention contemplates an alternating current clutch including normally separated, axially movable input and output drive elements. A non-rotatable electromagnetic device including relatively movable members which are operatively connected to the elements and separated by an air gap. When the electromagnetic device is energized the relatively movable members close the air gap. The drive element is engaged during the initial movement of the members closing the air gap and in the remaining movement closing the air gap a loading force is applied to the clutch elements to determine the torque capacity of the clutch.

This invention provides an A.C. clutch having an input member driven by a motor shaft and including friction disc and an output friction disc. A control plate is biased by a return spring to one position and is connected to the input member through a thrust bearing. A loading plate is mounted in the housing for limited axial movement. A torque spring acting on the loading plate urges it against a stop. An electromagnetic device moves the plates towards each other when energized. The torque spring is stronger than the return spring whereby energization of the electromagnetic device is operative to move the plates towards each other. The control plate first moves from its one position to a second position determined by engagement of the input member with the output member after which engagement the loading plate moves against the torque spring load to transfer the torque spring force to the input member through the thrust bearing.

The invention also provides means for adjusting the force of the torque spring to thereby adjust the torque capacity of the clutch.

This invention also provides a friction drive having an input member and an output member, a non-rotating loading plate, spring means acting on the plate, means transferring the spring load from the plate to one of the members, and provides for adjusting the spring load.

BRIEF DESCRIPTION OF THE DRAWINGS

FIG. 1 is an end elevation of the clutch as viewed from the left in FIG. 2.
FIG. 2 is a section on line 2—2 in FIG. 1.
FIG. 3 is a side elevation in line 3—3 in FIG. 1.
FIG. 4 is an end view with the cover removed.

DETAILED DESCRIPTION OF THE DRAWINGS

The clutch is contained in a housing or enclosure including a mounting bracket 10 which is designed to be connected to the end of a standard A.C. motor with the output shaft of the motor projecting into the clutch housing as explained more fully hereinafter. The housing also includes an end bell 12 which is provided with bearings 14, 16 supporting output shaft 18. The clutch output (driven) member or element 20 is fixed on the output shaft 18.

The electric motor shaft projects into the interior of the transfer ring assembly 22. A splined fitting on the motor shaft engages splines 24 on the interior of ring 22 to drive the transfer ring 22 while allowing the ring to move axially along the splined connection. Axial movement of the transfer ring is controlled by the position of control ring or control plate 26 which has two opposed ears which are apertured to fit over the anti-rotation spring loading arrangement generally designated 28. This arrangement includes screw 30 fixed in the bracket and having sleeve 32 threaded into the screw 30. The control plate 26 seats against shoulder 34 of the sleeve while bushing 36 slidably mounted on the exterior of the sleeve has a shoulder which captures the plate between the bushing shoulder and flange 34. The outer end of sleeve 32 is provided with washer 38 held in place by snap ring 40. The hex shaped end 42 of sleeve 32 is used to adjust the clutch clearance.

Spring 44 compressed between washer 38 and the flange of bushing 36 biases the control plate 26 to the right. The control plate is connected to the transfer ring 22 through the thrust bearing 46. Thus, the control plate controls axial movement of the transfer ring. The clutch input member or element 48 is connected to the transfer ring by screws 50. When the control plate is in its far right position there is enough clearance so the clutch is disengaged. When the control ring or plate 26 is moved to the left, the clutch driver 48 moves to the left and squeezes the driven discs to transfer motion to the driven disc 54 and to the driven perimeter 56 of clutch output 20. The transfer ring and the clutch input can move to the left only as far as necessary to take up the running clearance in the clutch. This is important to keep in mind to understand the further operation of this invention.

At two diametrically opposed locations the control plate 26 has an electromagnet ("Magnet") including core 58 and coil 60 mounted in position to attract armature 62 fixed on the loading plate 64. The loading plate 64 is axially movable but is non-rotatable in the housing. Thus, at four locations loading plate 64 is apertured to fit over a bushing 66 fitted on screw 68 threaded into the end wall of the bracket 10. Nut 70 is threaded on screw 68 and captures the spring 72 to compress the spring between the nut and flange of bushing 66. The spring force is transferred through the bushing 66 to the loading plate 64. The axial position of loading plate 64 determines the location of the armature 62 relative to the core 58 of the Magnet, i.e., it determines the air gap of the Magnet assembly. The air gap is adjusted by turning nut 73.

To the left of the end of each screw 68 there is a stand-off 74 which screws onto 68. Screw 76 through end bell 12 into the stand-off holds the assembly together before it is mounted on the motor. Thru bolts are used to mount the assembly on a motor.

To understand the operation of this invention, it is helpful to utilize some dimensions at this point. These are typical dimensions for a given clutch assembly and are not expected to be taken as being limiting in any respect. They simply illustrate a principal. Thus, the air gap (to which reference has just been made) is initially set at 0.078" which means the loading plate 64 can move 0.078" relative to the Magnet core 58 which is the same thing as saying it can move 0.078" relative to the control plate 26 on which the core is mounted. The running clearance of the clutch assembly is 0.02". Thus, the control plate can move to the left only 0.02" before the clutch is engaged.

It should be noted at this point the spring 44 loading the control plate is weaker than the spring 72 biasing the loading plate. This means that when the Magnets are energized, the first thing that happens is that the core moves toward the armature, i.e., it overcomes the weaker of the two springs. When the clutch engages there is 0.058" of available movement remaining and this is used by moving the armature toward the core to close the remainder of the air gap. This means the loading plate 64 moves off its stop and moves to the right against the load of spring 72.

Before the Magnet is energized the torque spring force is cancelled out, that is, it acts to the right towards bracket 10 and it also acts through nut 73 onto screw 68 which is threaded into bracket 10. But when the loading plate moves away from the limit stop to close the air gap, the spring force acts on the plate and the plate is now connected to the control ring 26 through the Magnet assembly. The spring force now acts on the control ring which in turn transfers the load through the thrust bearing 46 onto transfer ring 22ᵉ and then the clutch input. Thus, the force of the four springs 72 determines the axial load on the clutch. The force can be adjusted by adjusting each of the nuts 70. The axial loading force on the clutch will determine the torque capacity of the clutch. This then provides an A.C. clutch with a very simple adjustment of torque capacity. The adjustment is simplified by providing cover 12 with a plurality of windows 78 affording access to the nuts 70 for adjusting the torque and also giving access to hex shaped ends 42 of sleeve 32 to adjust the running clearance of the clutch. The windows are normally "closed" by covers 79.

With the foregoing in mind, it will be appreciated the present A.C. clutch eliminates the use of commutators through use of stationary (i.e. non-rotating) electromagnetic components to effect engagement. Both the engagement and disengagement action and the clutch loading action is transmitted through a thrust bearing to the clutch input.

When the solenoid is de-energized, the first thing that happens is the torque springs kick the armature away from the core until the loading plate is stopped by the nut 73. At that time, the remaining available motion moves the control ring to the right to disengage the clutch. The sequence on engagement and on disengagement is so fast you can't see it.

The force of the return spring acting on the control plate is in opposition to the direction of the torque loading spring force when the clutch is engaged. Therefore, the return spring force should be kept low. There has to be some return spring force, however, since otherwise the clutch might not open to its maximum clearance and there would be excessive wear.

I claim:

1. An alternating current clutch including normally separated input and output drive elements, one of said input and output elements being axially movable relative to the other of said input and output elements, non-rotatable electromagnetic means including relatively movable members separated by an air gap when the electromagnetic means is not energized, one of said members being connected to one of said input and output elements, energization of the electromagnetic means causing the relatively movable members to close the air gap, first means operative during energization of said electromagnetic means and during initial movement of said members to close the air gap for causing initial engagement of said input and output elements, and second means including said first means, said second means being arranged to apply a loading force to said input and output elements subsequent to the initial engagement of said input and output elements and when the air gap is closed, said loading force determining the torque capacity of the clutch.

2. An alternating current clutch according to claim 1 including means for adjusting the magnitude of the loading force.

3. An alternating current clutch according to claim 2 and further including a mounting bracket, wherein said means for applying a loading force determining the the torque capacity of the clutch includes a screw fixedly attached to said mounting bracket, a nut movably threaded onto said screw, and a spring extending between said nut and one of said relatively movable members for biasing said one of said relatively movable members in the direction opposite the direction closing the air gap, and wherein said means for adjusting the magnitude of the loading force includes said nut.

4. An alternating current clutch according to claim 3 and further including a cover attached to said mounting bracket and including a window affording access to said nut.

5. A clutch having a torque capacity and including a housing, normally separated coaxial drive and driven clutch elements mounted on said housing, one of said clutch elements being axially movable relative to and into engagement with the other of said clutch elements to transmit power, a loading plate, a stop mounted on said housing, spring means for biasing the loading plate against the stop, and means for moving said clutch elements into and out of engagement, said moving means moving said loading plate to an operative position off said stop and against the force of said spring means only after said clutch elements are moved into engagement, and said moving means operatively connecting said loading plate to said one of said clutch elements when said loading plate reaches said operative position to transfer the spring force to said one of said clutch elements to bias said one of said clutch elements against the other of said clutch elements, the spring force transmitted to said one of said clutch elements determining the torque capacity of said clutch.

6. A clutch according to claim 5 including means for adjusting the force of the spring means to adjust the torque capacity of the clutch.

7. An electric clutch according to claim 6 and further including a mounting bracket, a screw fixedly attached to said mounting bracket, and a nut movably threaded onto said screw, wherein said spring means biasing the loading plate against the stop includes a spring extending between said nut and the loading plate, and wherein said means for adjusting the force of the spring means includes said nut.

8. An electric clutch according to claim 7 and further including a cover attached to said mounting bracket and including a window affording access to said nut.

9. An alternating current clutch comprising,
a housing,
coaxial driving and driven elements mounted on said housing, one of said driving and driven elements being axially movable relative to the other of said driving and driven elements between engaged and disengaged positions,
a non-rotatable control member operatively connected to said one of said driving and driven elements to move said one of said driving and driven elements between said engaged and disengaged positions in response to movement of said control member,
release spring means for biasing the control member to a first position in which the driving and driven elements are disengaged,
a stop mounted on said housing,
a non-rotatable loading member movable between an operative position against said stop and an inoperative position spaced from said stop and toward the control member,
a torque spring biasing the loading member to said inoperative position against said stop,
electromagnetic means mounted on said control and loading members and having an initial air gap which is open when said control member is in said first position and when said loading member is in said inoperative position, said air gap being closed when the electromagnetic means is energized, energization of said electromagnetic means causing movement of the control member to cause engagement of said driving and driven elements,
the travel of the control member to cause engagement of said driving and driven elements being less than said air gap so the driving and driven elements are engaged in the first movement closing the air gap and the loading member is then moved from said stop to said operative position,
the force of the torque spring acting through the electromagnetic means when the air gap is closed to provide a load force which is transferred to the control member and to the driving and driven elements.

10. An alternating current clutch comprising
a housing,
an output member rotatably mounted on said housing and including friction means,
a control plate mounted on the housing for limited axial movement,
return spring means for biasing the control plate to one position,
an input member movable into engagement with said output member and including friction means, said input member being rotatably mounted on said housing,
a thrust bearing between the control plate and the input member,
a loading plate mounted on the housing for limited axial movement,
a stop mounted on the housing,
torque spring means acting on the loading plate for urging the loading plate against said stop, and
electromagnetic means for moving said control and loading plates towards each other when energized, movement of the control plate from said one position toward the loading plate acting through the thrust bearing to move the input member into initial engagement with the output member,
said torque spring means exerting more force than said return spring means, and
energization of the electromagnetic means being operative to move the control and loading plates towards each other such that the control plate moves from said one position to a second position, said second position being determined by said initial engagement of the input member with the output member, after which the loading plate is moved against the torque spring means to transfer the torque spring force to the input member through the control plate and the thrust bearing.

11. An alternating current clutch according to claim 10 including means for adjusting the force of the torque spring means.

12. A clutch according to claim 11 in which the electromagnetic means comprises solenoid means carried on one of said control and loading plates, and an armature carried on the other of said control and loading plates.

13. A clutch according to claim 12 including means for adjusting said stop to vary the spacing between the solenoid means and the armature.

14. A clutch according to claim 13 in which the torque spring means is compressed between the loading plate and said means for adjusting the force of the torque spring means.

15. An alternating current clutch according to claim 11 and further including a mounting bracket, a screw fixedly attached to said mounting bracket, and a nut movably threaded onto said screw, wherein said torque spring means acting on the loading plate includes a spring extending between said nut and the loading plate, and wherein said means for adjusting the force of the torque spring means includes said nut.

16. An alternating current clutch according to claim 15 and further including a cover attached to said mounting bracket and including a window affording access to said nut.

17. An alternating current clutch comprising
a housing,
normally separated input and output friction drive elements mounted on said housing,
a non-rotatable control plate connected to one of said input and output elements for moving said one of said input and output elements into driving engagement with the other of said input and output elements,
a loading plate mounted on said housing,
return spring means for biasing said control plate away from said loading plate to a position wherein said input and output elements are disengaged,
torque spring means for biasing said loading plate away from said control plate,
a limit stop mounted on said housing and engaged by said loading plate when acted upon by said torque spring means, and
electromagnetic means for moving said control plate and said loading plate toward each other, movement of said control plate toward said loading plate causing engagement of said input and output elements, said torque spring means having a greater force than said return spring means whereby the initial movement caused by said electromagnetic means is movement of said control plate toward said loading plate against the force of said return spring means to cause initial engagement of said input and output elements, and whereby the movement subsequently caused by said electromagnetic means is movement of said loading plate toward said control plate against the force of said torque spring means such that the force of said torque spring means is transferred to said control plate and thereby to said input and output elements after said control plate and said loading plate are engaged.

18. A friction drive comprising an input member and an output member having friction drive surfaces therebetween, one of said input and output elements being axially movable relative to the other of said input and output elements, a non-rotating loading plate, spring means for exerting a spring force on said loading plate, means for adjusting the force exerted by said spring means on said loading plate, and means for selectively connecting said loading plate to one of said input and output members to transfer the spring force from said loading plate to said one of said input and output members to bias said input and output members toward each other such that said friction drive surfaces engage each other, said connecting means including means for selectively and alternatively disconnecting said loading plate from said one of said input and output members to remove the spring force from said one of said input and output members.

19. A friction drive according to claim 18 and further comprising a mounting bracket, a screw fixedly attached to said mounting bracket, and a nut movably threaded onto said screw, wherein said spring means exerting a force on said loading plate includes a spring extending between said nut and said loading plate, and wherein said means for adjusting the force exerted by said spring means includes said nut.

20. A friction drive according to claim 19 and further comprising a cover attached to said mounting bracket and including a window affording access to said nut.

21. A torque limiting friction drive comprising
an input member and an output member having friction drive surfaces therebetween, one of said input and output elements being axially movable relative to the other of said input and output elements,
a non-rotating member,
spring means for exerting a force on said nonrotating member,
bearing means connected to one of said input and output members for transferring a force thereto,
electromagnetic means for selectively connecting said non-rotating member to said bearing means to transfer the force exerted by said spring means to said one of said input and output members to bias said input and output members toward each other such that said friction drive surfaces engage each other, said electromagnetic means also including means for selectively and alternatively disconnecting said non-rotating member from said bearing means to remove the spring force from said one of said input and output members, and
means for adjusting the force exerted by said spring means on said non-rotating member.

22. A friction drive according to claim 21 and further comprising a mounting bracket, a screw fixedly attached to said mounting bracket, and a nut movably threaded onto said screw, wherein said spring means exerting a force on said non-rotating member includes a spring extending between said nut and said non-rotating member, and wherein said means for adjusting the force exerted by said spring means includes said nut.

23. A friction drive according to claim 22 and further comprising a cover attached to said mounting bracket and including a window affording access to said nut.

24. A clutch having a torque capacity and comprising
a housing,
normally separated, coaxial clutch elements mounted on said housing, one of said clutch elements being axially movable relative to and into engagement with the other of said clutch elements to transmit power,
a non-rotatable loading plate mounted on said housing,
a stop mounted on said housing,
spring means for biasing said loading plate against said stop, and
means for moving said clutch elements into and out of engagement, said moving means moving said loading plate to an operative position off said stop and against the force of said spring means only after said clutch elements are moved into engagement, and said moving means operatively connecting said loading plate to said one of said clutch elements when said loading plate reaches said operative position to transfer the spring force to said one of said clutch elements to bias said one of said clutch elements against the other of said clutch elements, the spring force transmitted to said one of said clutch elements determining the torque capacity of said clutch,
said means for moving said clutch elements, said means for moving said loading plate and said means for connecting said loading plate to said one of said clutch elements including
a non-rotatable control plate connected to said one of said clutch elements,
electromagnetic means including an armature fixed on one of said loading plate and said control plate and coil means fixed on the other of said loading plate and said control plate, said armature and said coil means being movable into and out of engagement,
whereby the force of said spring means acts on said one of said clutch elements through said control plate, said electromagnetic means, and said loading plate when said armature engages said coil means.

25. A clutch according to claim 24 including means for adjusting the force of the spring means to adjust the torque capacity of the clutch.

26. An electric clutch according to claim 25 and further including a mounting bracket, a screw fixedly attached to said mounting bracket, and a nut movably threaded onto said screw, wherein said spring means biasing the loading plate against the stop includes a spring extending between said nut and the loading plate, and wherein said means for adjusting the force of the spring means includes said nut.

27. An electric clutch according to claim 26 and further including a cover attached to said mounting bracket and including a window affording access to said nut.

* * * * *